(12) United States Patent
Dumov et al.

(10) Patent No.: US 10,474,570 B2
(45) Date of Patent: Nov. 12, 2019

(54) FLASHWARE USAGE MITIGATION (71) Applicant: Cisco Technology, Inc., San Jose, CA (US)

(72) Inventors: Leo Dumov, Los Gatos, CA (US); Rohit Jindal, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 366 days.

(21) Appl. No.: 14/951,357

(22) Filed: Nov. 24, 2015

(65) Prior Publication Data

US 2017/0147238 A1    May 25, 2017

(51) Int. Cl.
*G06F 12/00* (2006.01)
*G06F 12/02* (2006.01)

(52) U.S. Cl.
CPC .. *G06F 12/0246* (2013.01); *G06F 2212/1024* (2013.01); *G06F 2212/7203* (2013.01); *Y02D 10/13* (2018.01)

(58) Field of Classification Search
CPC ......... G06F 12/0246; G06F 2212/1024; G06F 2212/7203; Y02D 10/13
See application file for complete search history.

(56) References Cited

U.S. PATENT DOCUMENTS

| 7,447,846 | B2 | 11/2008 | Yeh | |
| 7,797,275 | B2* | 9/2010 | Lee | G06F 12/0804 707/618 |
| 8,275,945 | B2* | 9/2012 | Tzeng | G06F 12/0246 710/52 |
| 8,458,393 | B2 | 6/2013 | Tzeng | |
| 8,966,159 | B2* | 2/2015 | Ou | G06F 12/0246 711/103 |
| 9,021,186 | B2* | 4/2015 | Tzeng | G06F 12/0246 710/36 |
| 9,280,472 | B1* | 3/2016 | Dang | G06F 12/0871 |
| 2010/0049940 | A1* | 2/2010 | Ware | G06F 12/0292 711/203 |
| 2010/0274772 | A1* | 10/2010 | Samuels | G06F 17/30156 707/693 |
| 2011/0138106 | A1* | 6/2011 | Prabhakaran | G06F 12/0804 711/103 |

(Continued)

OTHER PUBLICATIONS

Lu, et al., "ReconFS: A Reconstructable File System on Flash Storage", the Proceedings of the 12th USENIX Conference on File and Storage Technologies (FAST '14). Feb. 17-20, 2014, 15 pages, Santa Clara, CA.

(Continued)

*Primary Examiner* — Prasith Thammavong
(74) *Attorney, Agent, or Firm* — Behmke Innovation Group LLC; James Behmke; Stephen D. LeBarron (57) ABSTRACT

In one embodiment, a memory control process of a device receives a plurality of program/erase (P/E) requests for a flash memory of the device. The memory control process then stores data associated with the plurality of P/E requests in a random access memory (RAM) of the device, and aggregates the plurality of P/E requests into a single P/E operation. The memory control process may then send the single P/E operation to the flash memory at a given interval to update the flash memory with the data stored in the RAM.

16 Claims, 10 Drawing Sheets

(56) References Cited

U.S. PATENT DOCUMENTS

| | | | |
|---|---|---|---|
| 2012/0054152 A1* | 3/2012 | Adkins | G06F 17/30371 |
| | | | 707/623 |
| 2013/0326125 A1* | 12/2013 | Chang | G06F 12/0246 |
| | | | 711/103 |
| 2014/0078344 A1* | 3/2014 | Yoon | H04N 5/907 |
| | | | 348/231.99 |
| 2014/0173175 A1* | 6/2014 | Kang | G06F 12/0246 |
| | | | 711/103 |
| 2014/0310574 A1 | 10/2014 | Yu et al. | |
| 2015/0046625 A1* | 2/2015 | Peddle | G11C 16/10 |
| | | | 710/308 |
| 2015/0193337 A1* | 7/2015 | Kimmel | G06F 12/0802 |
| | | | 711/103 |
| 2016/0034188 A1* | 2/2016 | Bisht | G06F 3/061 |
| | | | 710/53 |
| 2017/0075593 A1* | 3/2017 | Kim | G06F 3/0616 |
| 2017/0142202 A1* | 5/2017 | Chen | H04L 67/1097 |

OTHER PUBLICATIONS

Philhower, III, et al., "Integrating Flash Memory into Popular Applications", Flash Memory Summit, Aug. 2014, 21 pages, Santa Clara, CA.

\* cited by examiner

FLASHWARE USAGE MITIGATION

TECHNICAL FIELD

The present disclosure relates generally to computer technology, and, more particularly, to flashware usage mitigation.

BACKGROUND

Computer flashware, such as Compact Flash (CF), generally has a limited number of program/erase (P/E) cycles in its lifetime. Applications hosted on a device will write/read data to/from the flashware many times, eventually wearing out the useful life of the flashware on a device.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a memory control process of a device receives a plurality of program/erase (P/E) requests for a flash memory of the device. The memory control process then stores data associated with the plurality of P/E requests in a random access memory (RAM) of the device, and aggregates the plurality of P/E requests into a single P/E operation. The memory control process may then send the single P/E operation to the flash memory at a given interval to update the flash memory with the data stored in the RAM.

Description

Flashware or flash memory is a type of non-volatile computer storage medium that can be electrically programmed and erased. Different types of flash memory exist today, such as memory cards, USB flash drives, solid-state drives, or internal persistent memory used to store configuration data in numerous digital products, such as personal computers, mobile phones, digital cameras, scientific instrumentation, industrial robotics, medical electronics, and so on.

As noted above, one key disadvantage of flash memory is that it generally has a limited number of program/erase (P/E) cycles in its lifetime. That is, applications hosted on a device will write/read data to/from the flashware many times, eventually wearing out the useful life of the flashware on a device. Most commercially available flash products are guaranteed to withstand around 100,000 P/E cycles before the wear begins to deteriorate the integrity of the storage, though certain flash memory chips have recently been rated for 1,000,000 P/E cycles. At the same time, however, the current trend for the number of P/E cycles is lowering. For instance, while NAND flash is around 100,000 P/E cycles, eMMC flash (which has higher capacity) may be limited to only 10,000 P/E cycles, where the goal may be to use a higher storage capacity with a lower number of P/E cycles to effectuate a similar lifetime. Various other techniques have been developed to accommodate flash memory wear, such as wear leveling (remapping blocks in order to spread write operations between sectors), bad block management (BBM) (write verification and remapping to spare sectors in case of write failure), and others.

Generally speaking, flash memory wear has not been a concern for "read-only" applications, such as thin clients and routers, which are typically programmed only once or at most a few times during their lifetimes. For instance, whenever flashware (e.g., compact flash) is used in general router applications, its size and purpose are limited for computer networking needs. Typically it holds router images, and some other related data, like system configuration. The P/E cycles of the flash in the router are thus under-utilized, because updates of the above data are highly infrequent, and in many systems there are no updates for the lifetime of the flash.

However, this model changes for adding third-party applications support, especially in lower capability routers, such as for use in the Internet of Things (IoT), mobile-to-mobile (M2M) environments, or otherwise. Unlike a typical PC, these routers do not have solid-state hard disk drives based on the flash, but instead have small discrete flash components with limited capacity, thus, much more limited lifetime associated with the P/E cycles wear of the components.

Particularly for devices that convert from a typical "read-only" system to an application-hosting system (e.g., routers), but also for any computing device, device vendors are generally unable to control the code running in the third-party applications, which accesses the platform flash. As such, the applications may generate a potentially unlimited number of P/E cycles to the flash, and may write data very frequently. Since flash is often a non-replaceable component in such systems (typically soldered-on components), it may quickly wear out, rendering the entire system inoperable until it is replaced (either the entire system, or else just the flash memory). In particular, since the same flash often contains a device's operating system and other system files that are essential for the platform functionality, whenever the device's flash has reached its P/E cycle limit and is unusable, the entire system is completely disabled.

Accordingly, the techniques herein provide a manner by which a device's (e.g., router's) system software can limit the number of P/E cycles to flashware, particularly for third party applications, in order to insure a predictably longer lifetime of the entire system. That is, the techniques herein (e.g., a software-based solution that is dynamic and adjustable) mitigate the problem associated with the limited used of P/E cycles in flashware by allocating a mirroring random access memory (RAM)/cache for one or more applications executing on a device, which is then used to perform an "aggregated" flash synchronization.

Specifically, according to one or more embodiments of the disclosure as described in detail below, a memory control process of a device receives a plurality of P/E requests for a flash memory of the device. The memory control process then stores data associated with the plurality of P/E requests in a RAM of the device, and aggregates the plurality of P/E requests into a single P/E operation. The memory control process may then send the single P/E operation to the flash memory at a given interval to update the flash memory with the data stored in the RAM.

Figure 1A:
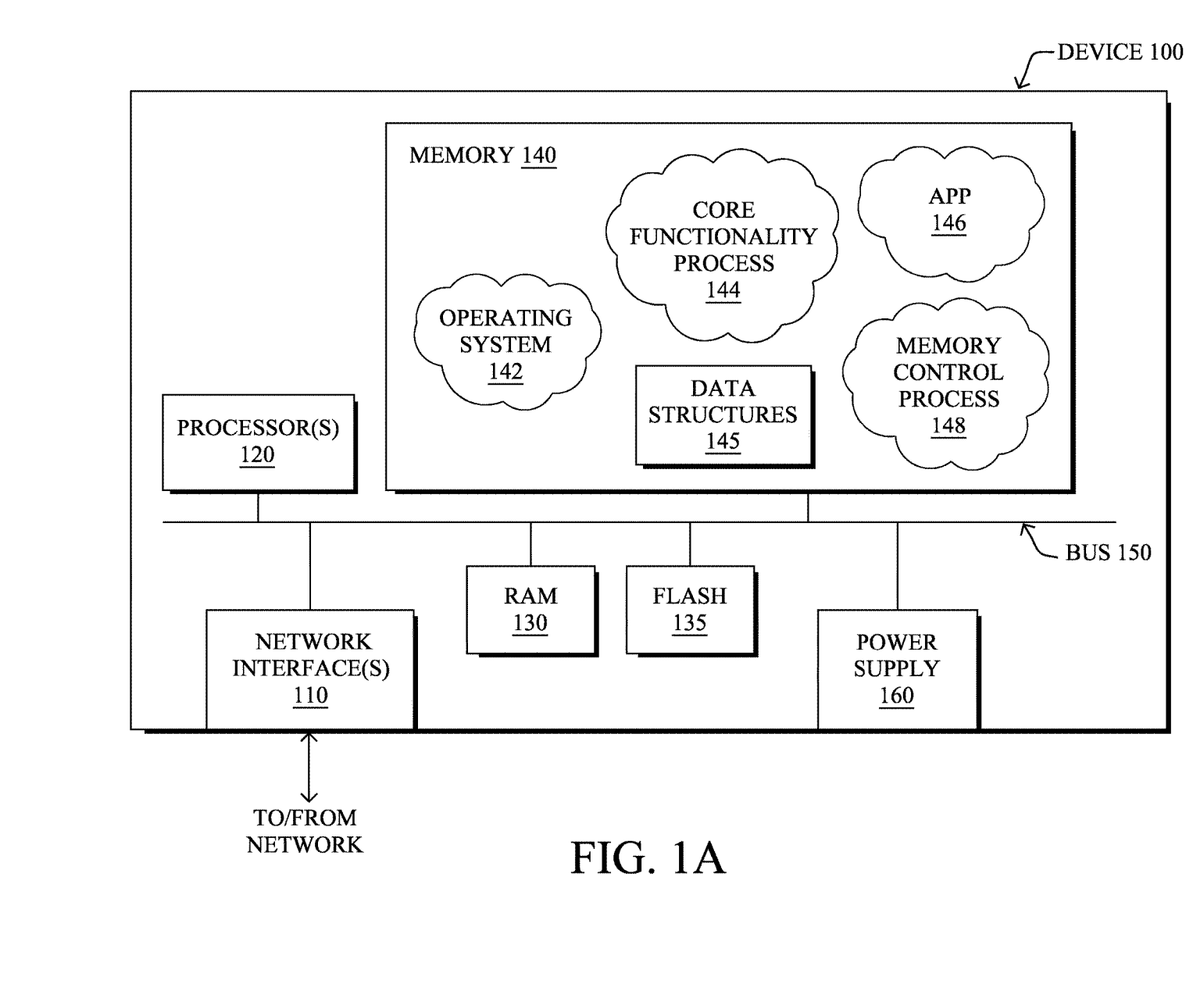
FIGS. 1A-1C illustrate an example computer device.

FIG. 1A is a schematic block diagram of a simplified example device 100 that may be used with one or more embodiments described herein. The device, such as a computer, router, etc., may comprise one or more network interfaces 110, at least one processor 120, a RAM 130, a flash memory 135, and a system memory 140 interconnected by a system bus 150, as well as a power supply 160. The network interface(s) 110 contain the mechanical, electrical, and signaling circuitry for communicating data with other connected devices. The memory 140 comprises a plurality of storage locations that are addressable by the processor 120 for storing software programs and data structures associated with the embodiments described herein. The processor 120 may comprise hardware elements or hardware logic adapted to execute the software programs and manipulate the data structures 145. Note that while RAM 130 is shown separately from system memory 140, certain embodiments may provide for memory 140 to be a portion of RAM 130. (Those skilled in the art will understand that the views shown herein are simplified examples, and not meant to represent an exact computer architecture of a device 100.)

An operating system 142, portions of which are typically resident in memory 140 and executed by the processor, functionally organizes the device by, among other things, invoking operations in support of software processes and/or services executing on the device. These software processes and/or services may comprise a core functionality process 144, one or more applications or "apps" 146 (e.g., third party apps), and an illustrative memory control process 148, as described herein. Optionally, where the device 100 is a router in a communication network, core functionality process 144 may contain computer executable instructions executed by the processor 120 to perform functions provided by one or more routing protocols, such as various routing protocols as will be understood by those skilled in the art.

Illustratively, the techniques described herein may be performed by hardware, software, and/or firmware, such as in accordance with the "memory control" process 148, which may contain computer executable instructions executed by a processor 120 to perform functions relating to the techniques described herein, e.g., in conjunction with core functionality process 144. For example, the techniques herein may be treated as extensions to conventional memory control protocols, and as such, may be processed by similar components understood in the art that execute those protocols, accordingly. It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while certain processes have been shown separately, those skilled in the art will appreciate that certain processes may be routines or modules within other certain processes, and that certain processes shown or described as a single process may be distributed amongst a plurality of processes.

Figure 1B:
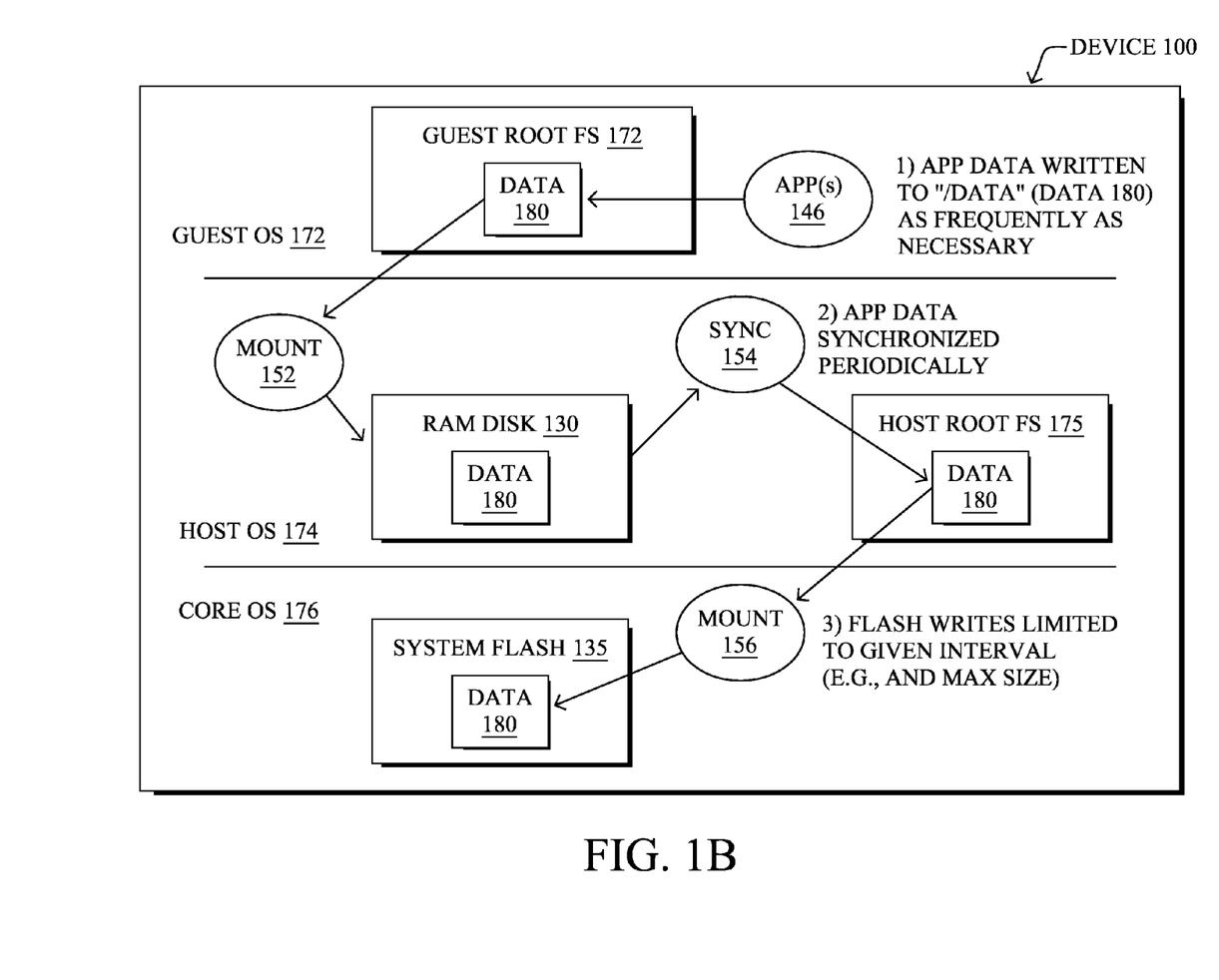

FIG. 1B illustrates an alternative view of the device 100 from FIG. 1A, generally as a more functional view of the embodiments described herein. In other words, although certain components of the functional view in FIG. 1B may correspond numerically to components of FIG. 1A (such as RAM 130 and flash 135), the functionality components of FIG. 1B may be based on the same components within the simplified view in FIG. 1A, but may also represent a specific implementation/arrangement of components separate from FIG. 1A. In either case, FIGS. 1A and 1B are meant to be illustrative examples for the benefit of one skilled in the art, and are not meant to be limiting computer architectures.

Particular to FIG. 1B, apps 146 (e.g., third party applications) run in a virtual environment (e.g., guest OS 172) that is connected to the rest of the system (for the passage of data 180) via an internal network connection. In the example architecture shown in FIG. 1B, the system runs two operating systems located in two different CPU cores. The first CPU core runs a core/primary OS 176 (e.g., a router OS), which "owns" all accesses to the system flash 135. The second CPU core runs a host OS 174 (or "hypervisor OS"), such as LINUX, and hosts the third party applications 146 (e.g., guest OS 172 using a kernel-based virtual machine or "KVM"-based hypervisor, or other types of hypervisors). The guest operating system 172 has mount 152 (e.g., a virtual file system mount, such as, for example, a 9P QEMU mount) of its RAMdisk (guest root file system (FS) 173) to the RAM based cache (RAM 130). This cache is also RAMdisk (the RAM being accessible directly to the host/hypervisor OS 174), the size of which may be generally equivalent to the size of the flash allocated for applications (e.g., 16M), as described below.

The hypervisor/host OS 174 contains a synchronization ("sync") daemon application 154 (e.g., RSYNC), which synchronizes the data 180 from cache (RAM disk 130) to the host/hypervisor OS Root file system 175 (e.g., which is also RAMdisk). The core file system mount 156 (e.g., a network file system or "NFS" in the case of routers) synchronizes application data from the hypervisor RootFS 175 (second CPU core) to the core/primary OS 176 (first CPU core) and to the flash 135.

As shown in FIG. 1B, application data 180 can be written as frequently as necessary, and then the synchronization from the guest root FS 173 to the cache (RAM) 130 (via mount 152) and/or host root FS 175 occurs periodically (e.g., every several minutes, described below). The applications 146 thus "think" that they are simply programming and erasing the flashware of the device 100, but in essence, this middle-ground shared memory is transparently controlling a cached version of commands for the flash, which then at specified intervals, performs a program/synchronization of the flash 135 based on the contents of the shared memory (e.g., using RSYNC or other flashing software).

Figure 1C:
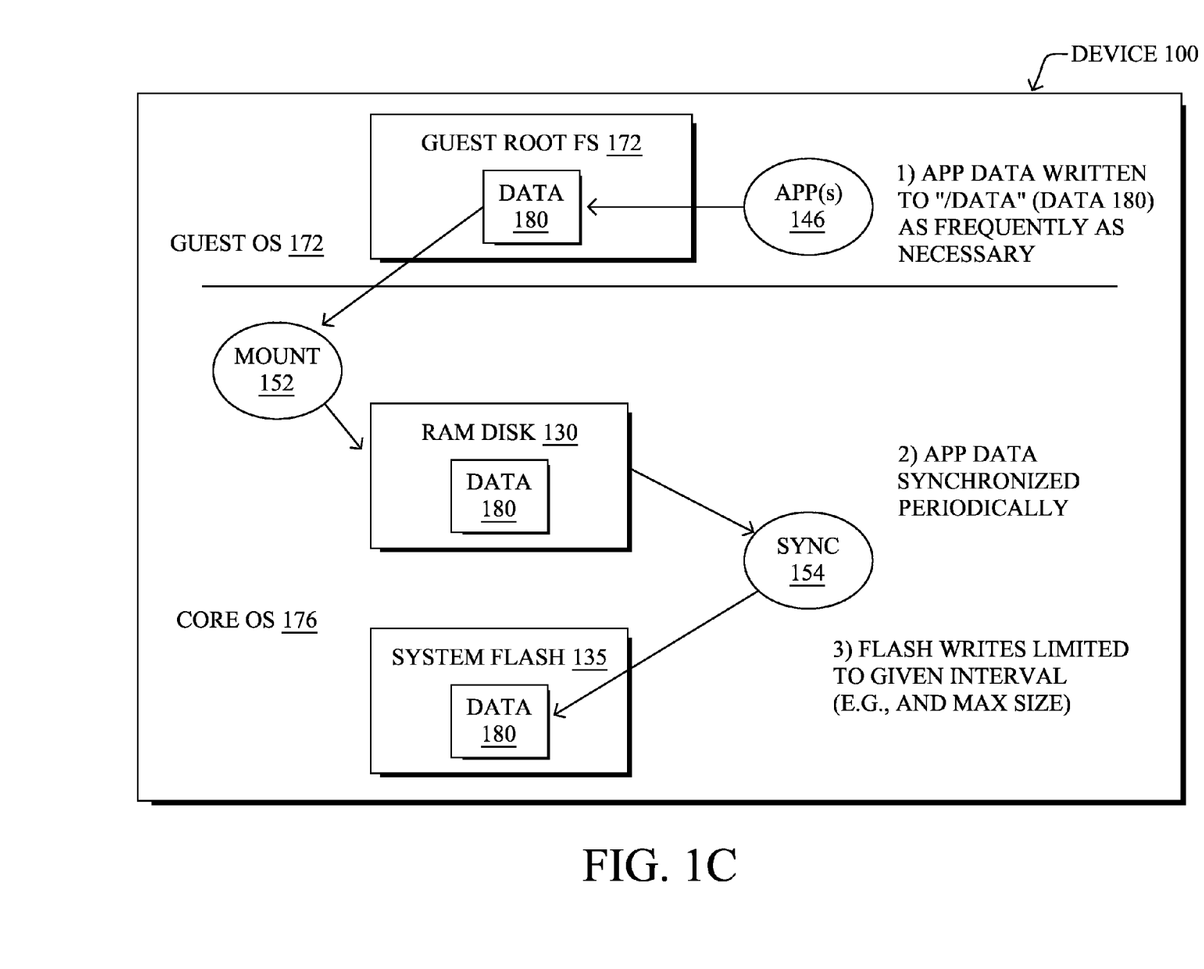

Note again that while FIG. 1B illustrates one example implementation of the techniques herein (e.g., with two processing cores and operating systems, multiple mounts and synchronization conduits, and so on), the techniques herein may involve more or fewer components, accordingly. For instance, the mount 152, sync 154, and mount 156 may simply be operative components of the memory control process 148 from FIG. 1A above, which is configured to aggregate P/E requests and send a single P/E operation to the flash memory via an interface to the core operating system, as described herein. As another example, in situations where a guest OS can execute within a core OS, then only one CPU core would be necessary. In such a single CPU core example, sync 154 would be writing aggregated write cycles from a guest OS directly to the flash, and there would this be no need for the second mount 156. For example, as shown in FIG. 1C, an example single CPU core system for device 100 is shown, where the RAM 130 can be written directly to the flash 135 by a sync daemon 154. Accordingly, any suitable architecture for the device 100 with a RAM 130 and flash 135 may benefit from the techniques herein, and such a system need not be limited to dual-core configurations, single-core configurations, isolated VM/container configurations, or any other configuration mentioned herein.

Figure 2:
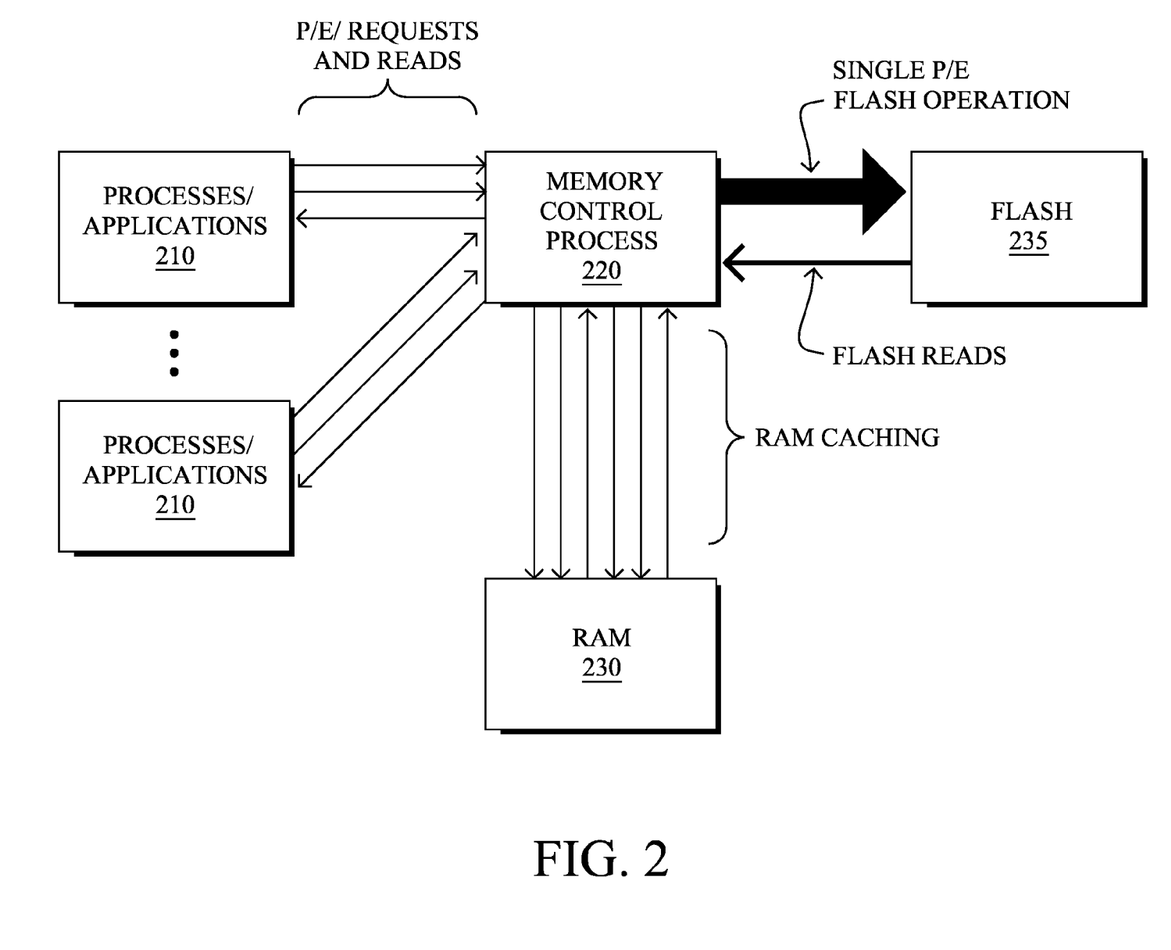
FIG. 2 illustrates a simplified example of flashware usage mitigation.
Figure 3:
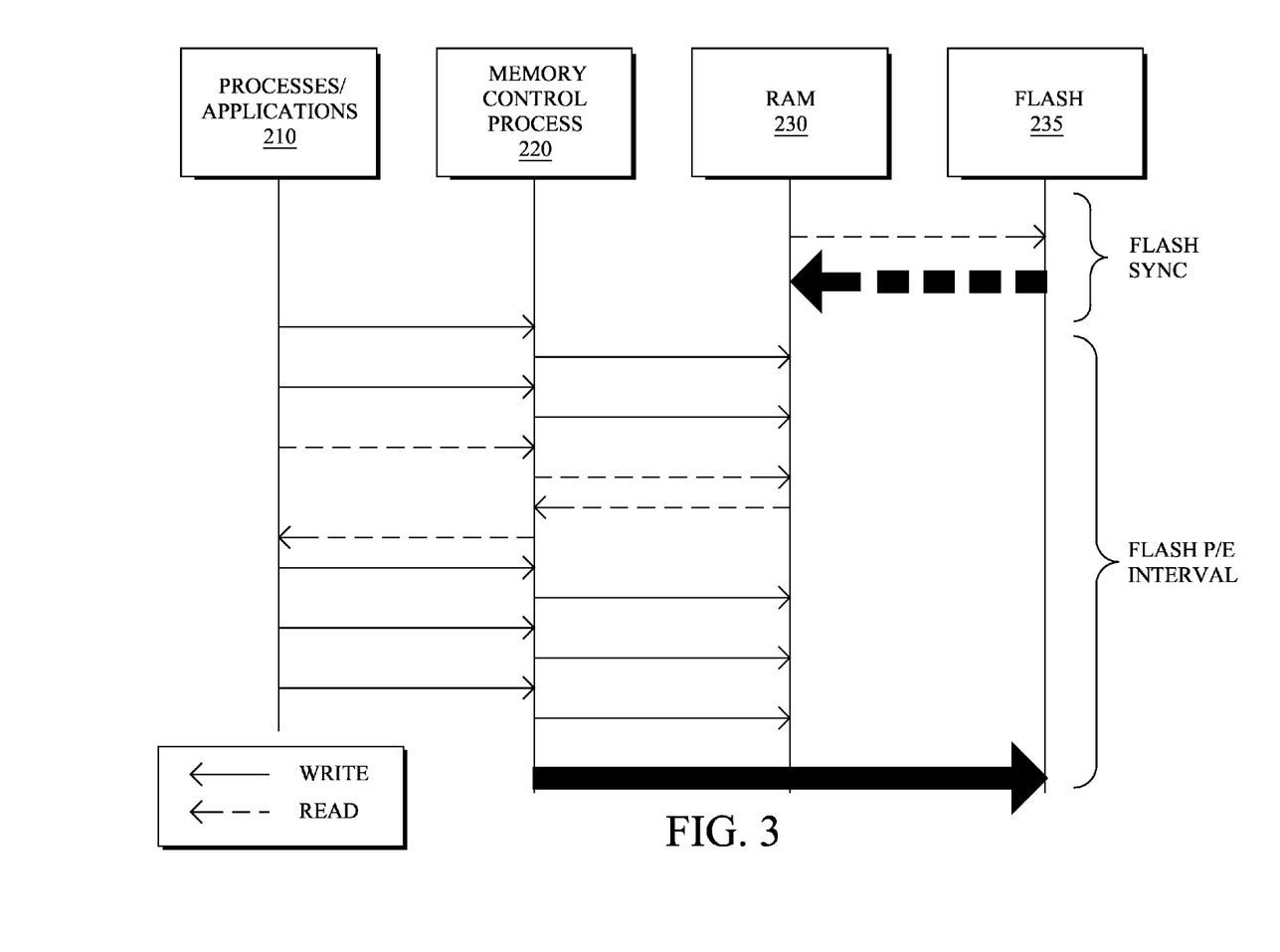
FIG. 3 illustrates another simplified example of flashware usage mitigation.

FIGS. 2-3 illustrate a simplified example of flashware usage mitigation in accordance with one or more embodiments described herein, generally more abstracted from the underlying hardware/software components of FIGS. 1A and 1B. In particular, as shown in FIG. 2, a block diagram illustrates basic high-level components of an example system that is configured to execute the techniques described herein. For instance, one or more processes or applications 210 may interface (either directly or indirectly) with a memory control process 220, which, as mentioned above, may be a single process (148), or may be a collection of mounts/syncs/etc. (152, 154, 156). The memory control process 220 can then manage the RAM 230 and flash 235.

Note that while FIG. 2 represents a simplified view of a computer memory system, it is important to note that applications 210 may be executed natively and/or within VMs. That is, from the core functionality perspective (e.g., a router), running third party applications in a VM (while running core applications natively) is very advantageous, as the core OS (and core applications) is protected, thus enhancing security on the device. The view shown in FIG. 2 is thus not meant to be limiting to the scope of the embodiments herein.

With reference now to both FIG. 2 and FIG. 3, illustrating an example timing diagram of the operations according to an example embodiment described herein, the memory control process 220 can receive P/E requests and read requests from the processes/apps 210. For P/E requests, the memory control process stores the requests (data 180 associated with the P/E requests) in RAM 230. Notably, read requests may generally be served by the RAM 230 based on an initial synchronization with the flash 235, depending on the design of the underlying system (e.g., in some instances, where an initial synchronization is not performed by the system, the service of read requests may depend on where the most recent version of the data is). The memory control process 220 aggregates the plurality of P/E requests into a single P/E operation, which is sent to the flash memory 235 at a given interval to update the flash memory with the data stored in the RAM. Notably, in one embodiment, an update to the flash memory implies only writing what data is different (the "diffs") from what is already stored in the flash, that is, for an illustrative 16M RAM, not all 16M is synchronized every time, but only the diffs (i.e., the diffs is the aggregated P/E cycles). The Rsync utility, in particular, synchronizes diffs between the source and target (and may even write a diff of a binary file, instead of the entire file).

As an example, assume that five applications all wish to program CF memory, or else that any number of applications combined otherwise results in five corresponding P/E cycles under a conventional system. The techniques herein, however, cache the five different memory access controls in the shared memory, and then at a given interval performs a single flash operation, thus reducing the number of P/E cycles considerably.

Figure 4:
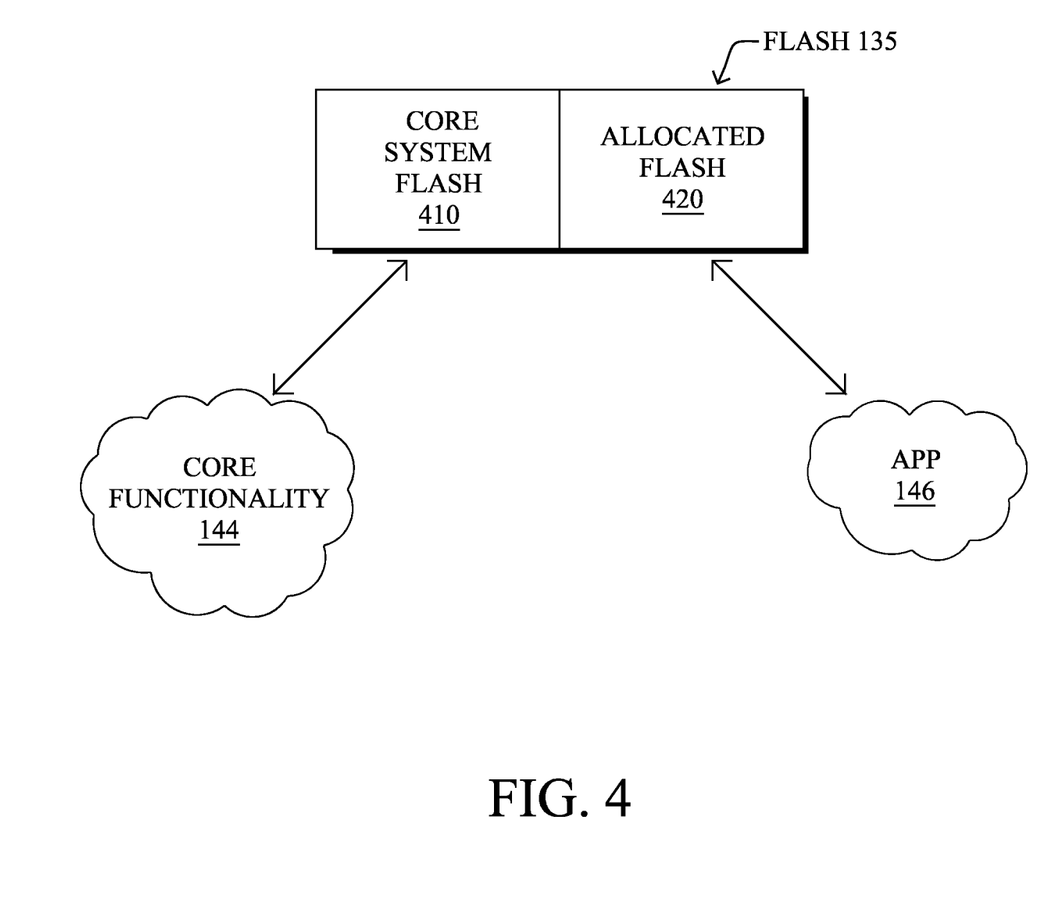
FIG. 4 illustrates a simplified example of flash allocation.

According to one or more embodiments herein, the flash P/E operation may also be strategically controlled to protect the overall integrity of the device 100, particularly by allocating a portion of the flash 135 for the applications 146. For example, FIG. 4 illustrates a simplified example of flash allocation in accordance with one or more embodiments described herein, where the flash 135 is shown having core system flash 410 and allocated flash 420, such that the physical components of the flash are dedicated to either core functionality or other applications (e.g., third party applications). Doing so thus preserves core (e.g., router) system images and configuration in the system flash 135 from being overwritten and/or otherwise damaged by the applications 146. By not disturbing the core system flash 410 when performing a P/E operation for the applications, the total flash capacity and wear-leveling capabilities of the entire flash based storage device can be utilized for smaller applications storage. In addition, by also isolating the minoring RAM 130 from the system and syncing it to the logically allocated portion 420 in the system flash 135, device (e.g., router) security remains uncompromised. Generally, in accordance with the techniques herein, an example size of the RAM 130 to minor the targeted flash capacity 420 is 1:1. Thus, if the system allocates 16 Mbytes of the system flash 135 for the applications 146, then 16 Mbytes of RAM may be used to minor the flash.

Figure 5A:
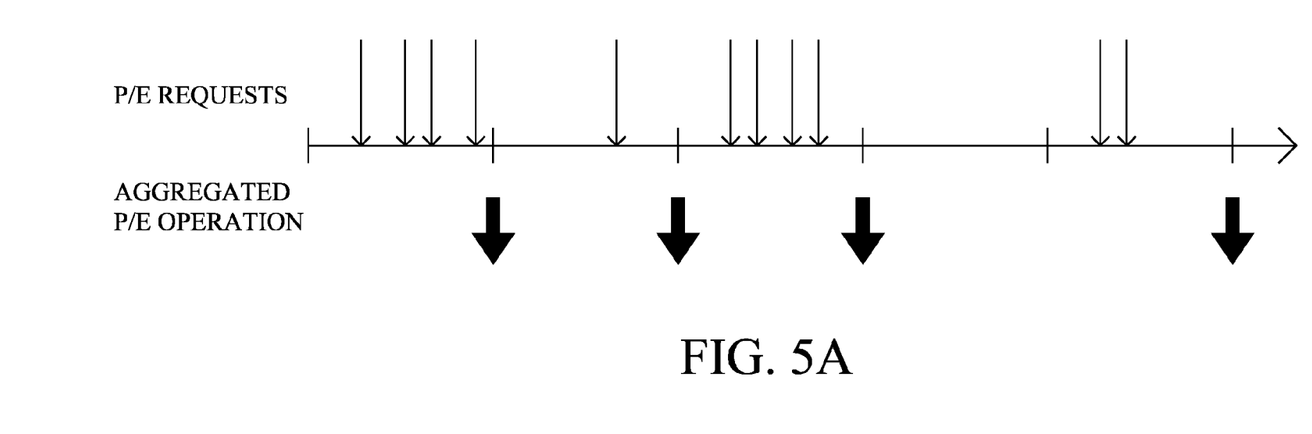
FIGS. 5A-5D illustrate simplified examples of flashware usage mitigation where the flashware update interval is based on different factors.

As mentioned above, the periodic interval used for the flashware usage mitigation techniques herein may be based on a variety of factors. For example, with reference to FIG. 5A, flashware usage mitigation may use a given interval is time-based in accordance with one or more embodiments described herein. Examples of timed intervals can range from a few minutes to even longer, where an example implementation might use a ten-minute timer. As a design enhancement, the time-based interval (period of update) may be determined generally based on a total size of the flash memory (total system flash size), an amount of the flash memory allocated to one or more applications generating the plurality of P/E requests (which is typically smaller fraction of the total flash), a type of the flash memory (e.g., SLC, eMMC, etc.), a projected lifetime of the flash memory (e.g., in years), and a life expectancy of the system (e.g., of device 100 itself, also in years). Note that if no P/E requests are received in a given time interval, then no aggregated P/E operation need take place. (Also note that the time interval may be periodic, or may alternatively restart each time a first new P/E request is received since the last aggregated P/E operation took place, e.g., ten minutes after the first P/E request to aggregate as opposed to ten minutes after the last aggregated P/E operation.) Note in one embodiment, a fixed period may be based on calculations (e.g., according to a flash vendor's specifications). However, other potential implementations exist, such as based on flash statistics (e.g., how many bytes are synchronized), adjusting the period accordingly.

Figure 5B:
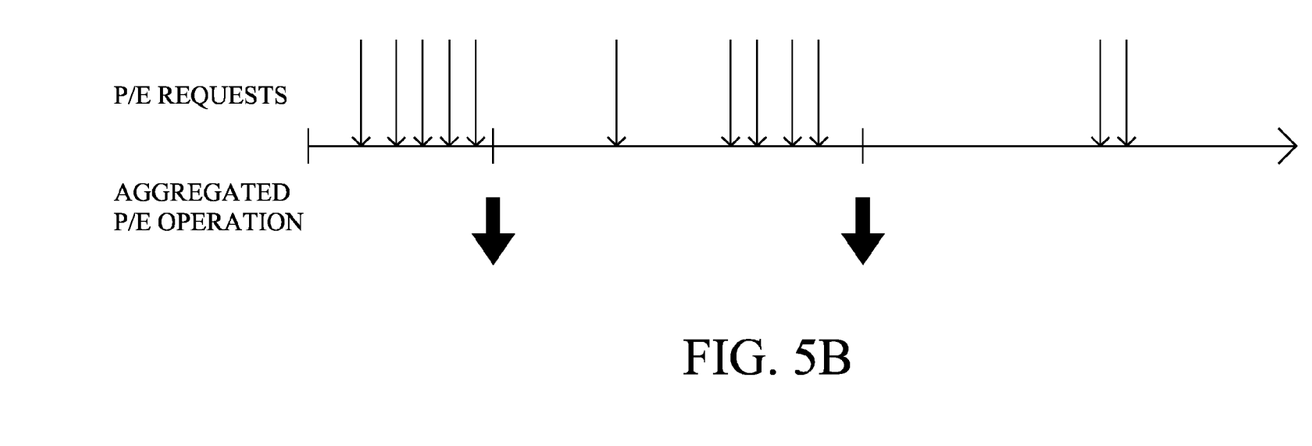
Figure 5C:
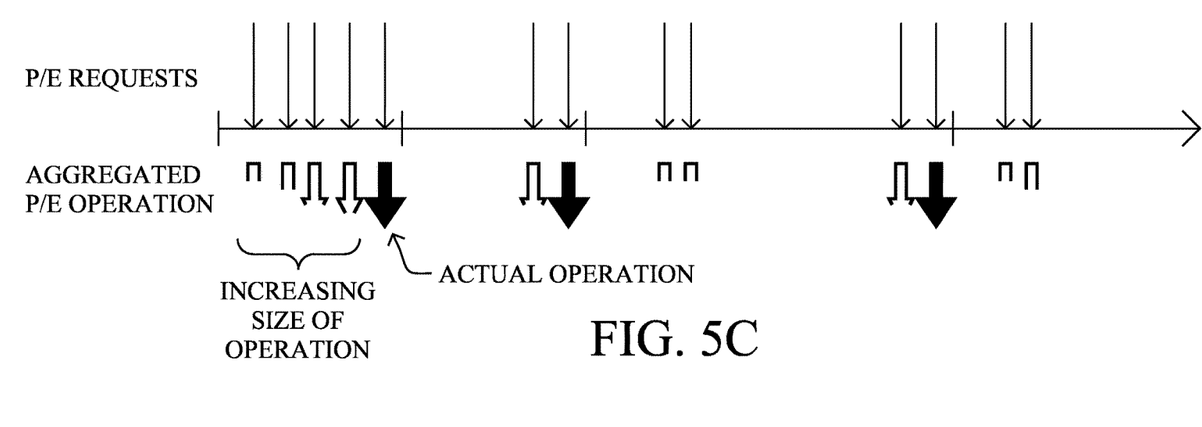
Figure 5D:
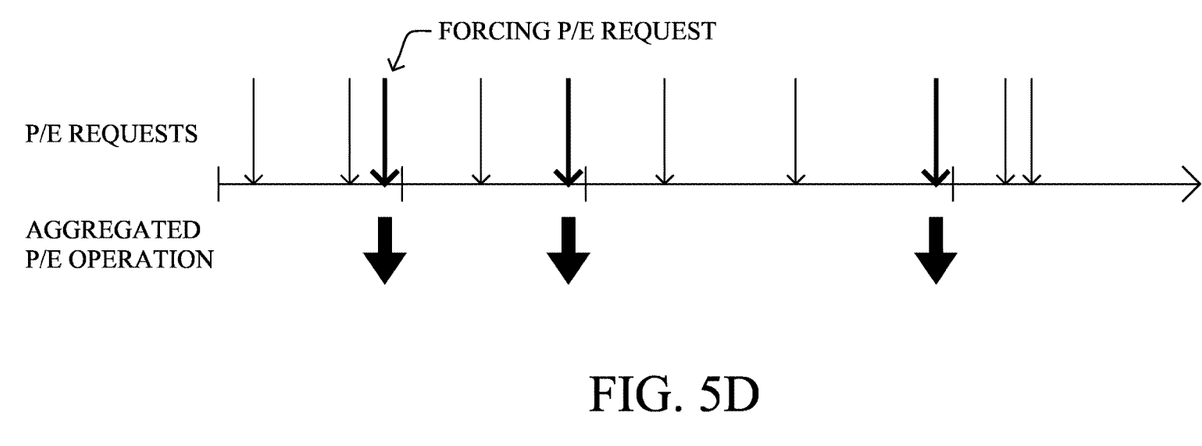

Alternatively or in addition, FIGS. 5B-5D illustrate other example factors that may be used for determining when the aggregating P/E operation is sent to the system flash. For instance, as shown in FIB. 5B, the given interval may be based on a number of the aggregated plurality of P/E requests (e.g., every five (shown), ten, fifty, etc. requests received or to perform). FIG. 5C illustrates another example where the given interval is based on a size of the single P/E operation from the aggregated plurality of P/E requests (e.g., 128 B, 256 B, 512 B, 1 MB, 2 MB, etc.).

Lastly, FIG. 5D illustrates where the given interval may be based on a particular application forcing a P/E operation to the flash memory, such as either the core functionality 144 forcing (or simply requesting) a flash P/E operation, or else a specific application 146 that has either access to demand the P/E operation, or a specific P/E request that is otherwise high priority (e.g., high-value data, data stored before a device shut-down, etc.). For instance, in the embodiment of FIG. 5D, the core functionality 144 may generally have direct access to the flash, and as such, need not (though may) require flashware mitigation as described herein. As such, when the core functionality 144 is performing an un-mitigated write to the flash, any pending P/E operations may then be triggered to "piggyback" on the forced flash action. Additionally, in certain embodiments, various "mission critical" operations, such as applications that require a flash write to avoid losing important data (such as in the event of an un-planned power outage of the device) may require (force) the flash write, based on application-specific policies, data-specific policies, command-specific policies, and so on. As such, the pending P/E operations may again be triggered to piggyback on the forced flash action.

Notably, any of the factors in FIGS. 5A-5D may be used, either singly or in combination, to create the desired interval. For instance, the interval may be timer based (e.g., ten minutes), but if the size or number of requests gets too large within that timer-based interval, then the aggregating P/E operation may be sent. (At such time, the timer can either be restarted from the time of the P/E operation, or else the timer may simply continue on its regular periodicity.)

As an example, assume that a system uses 1 Gbytes of SLC-based flash with up to 100,000 P/E cycles (per flash lifetime) for storing a maximum of 16 Mbytes of application data updated every ten minutes. In this configuration the estimated flash lifetime will be ten years with unlimited number of write cycles from the applications to the application RAM.

Figure 6:
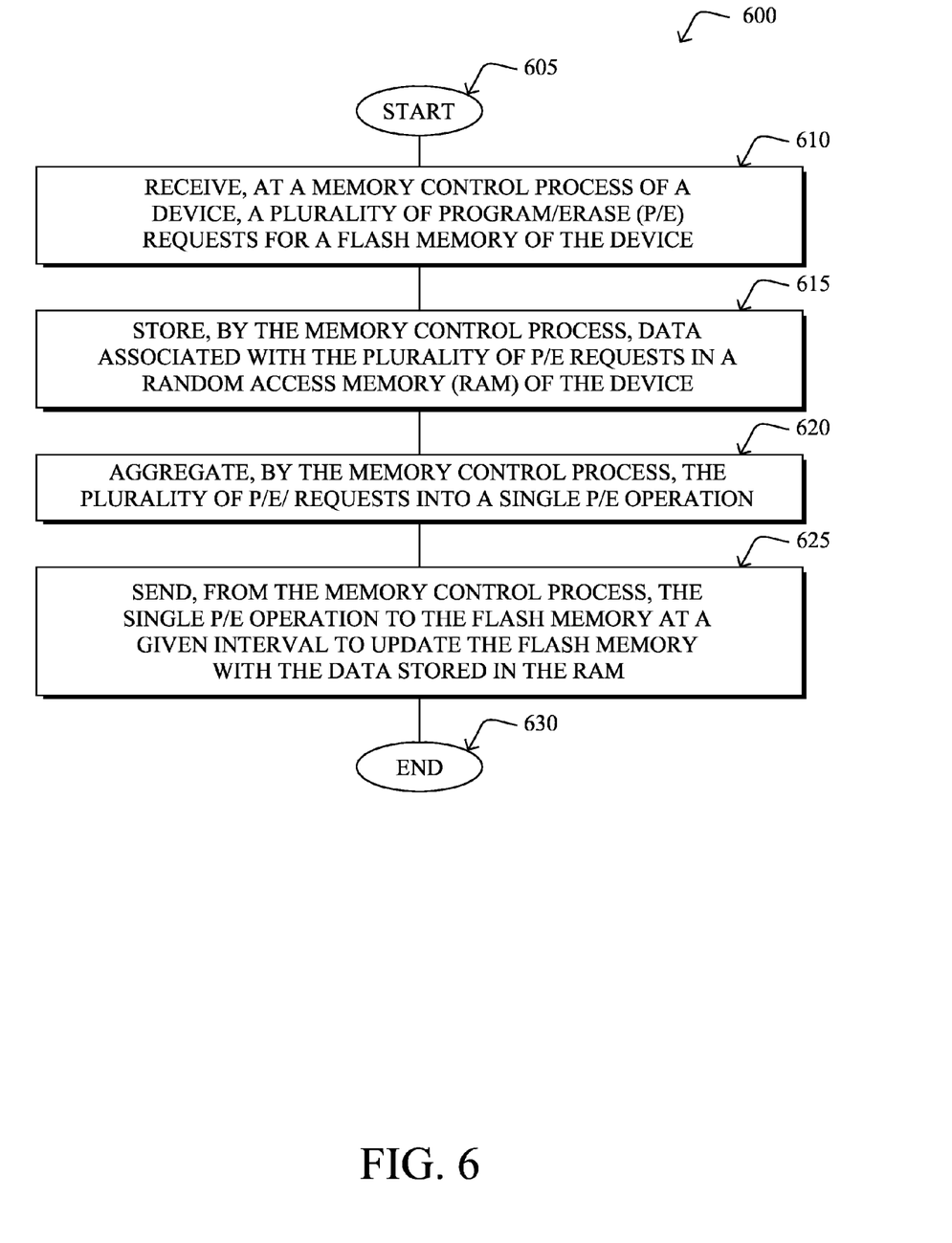
FIG. 6 illustrates an example simplified procedure for flashware usage mitigation.

FIG. 6 illustrates an example simplified procedure 600 for flashware usage mitigation in accordance with one or more embodiments described herein. The procedure 600 may start at step 605, and continues to step 610, where, as described in greater detail above, a memory control process 220 (e.g., memory control process 148, or mount 152, sync daemon 154, and mount 156) of a device 100 receives a plurality of P/E requests for a flash memory 235 of the device. As such, in step 615, the memory control process stores data 180 associated with the plurality of P/E requests in a RAM 230 of the device, and begins aggregating the plurality of P/E requests into a single P/E operation in step 620. In step 625, in response to a trigger for the given interval as mentioned above (e.g., with reference to FIGS. 5A-5D), the memory control process sends the single P/E operation to the flash memory 235 to update the flash memory with the data stored in the RAM 130. As noted above, this step may efficiently imply that only the diffs are written, and not all of the data stored in the RAM. The simplified procedure 600 may then end in step 630, notably restarting the given (e.g., periodic) interval and receiving further P/E requests in step 610.

Figure 7:
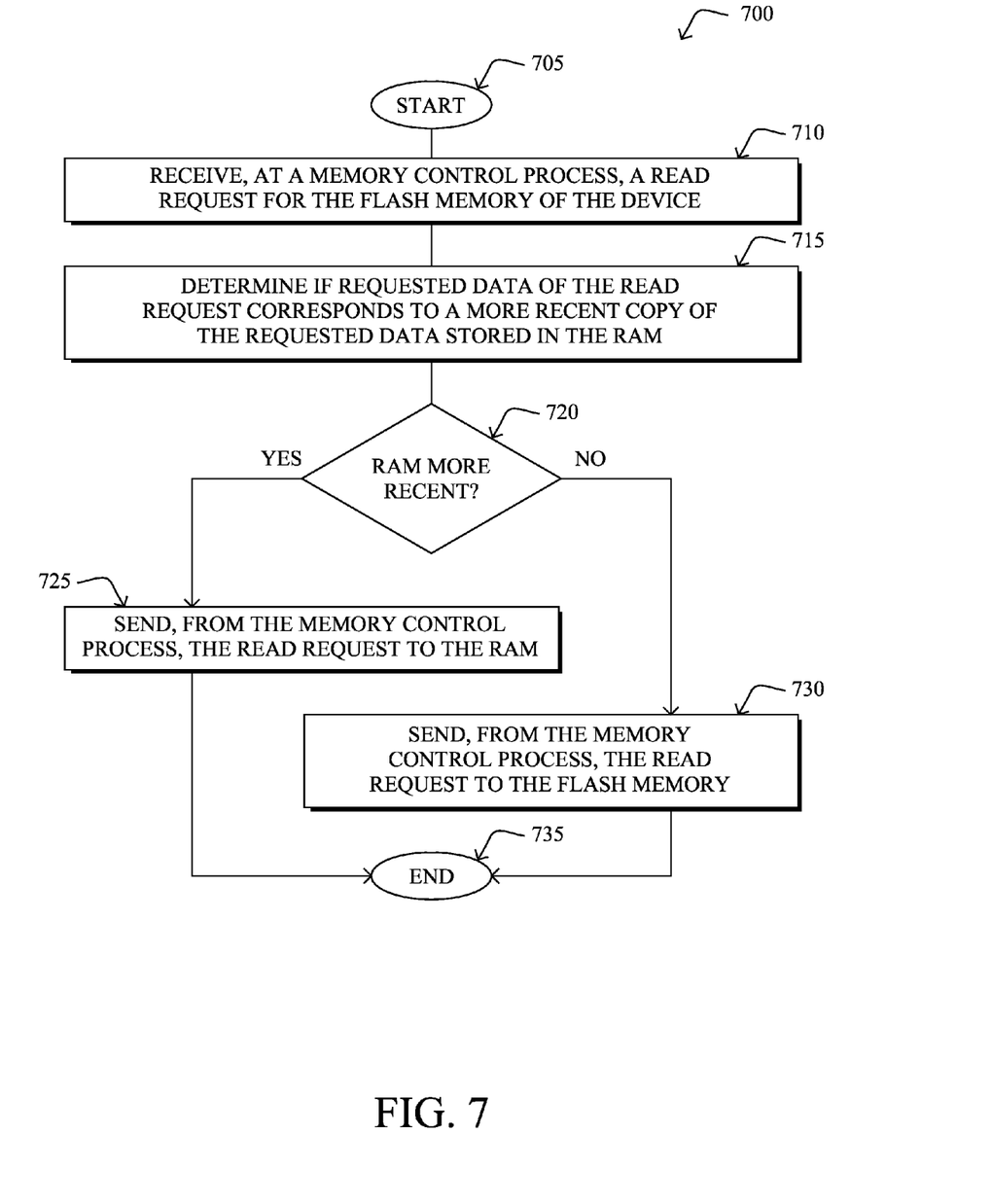
FIG. 7 illustrates another example simplified procedure for flashware usage mitigation, particularly with regard to read requests.

In addition, FIG. 7 illustrates another example simplified procedure 700 for flashware usage mitigation in accordance with one or more embodiments described herein, particularly with regard to read requests. The procedure 700 may start at step 705, and continues to step 710, where, the memory control process receives a read request the flash memory. In response, in step 715, the memory control process may determine if requested data of the read request corresponds to a more recent copy of the requested data stored in the RAM 230. Notably, as described above, in step 715 the more recent copy of the data may be kept in RAM 230 due to synchronizing the minor RAM 230 by reading flash 235 only for initialization (e.g., start-up). In this embodiment, step 715 determines that applications will read only from the mirror RAM, not from the flash. (This works well when the memory for the application in the flash is not written by any other entity (like a router OS), but entirely dedicated to the application.) Alternatively, if no initialization is performed, step 715 may be required to determine the location of the most recent data, either in RAM 230 or flash 235, accordingly.

If in step 720 the RAM is more recent, then in step 725 the read request is sent to the RAM, accordingly. On the other hand, if in step 720 the RAM is not more recent than the flash 235, then in step 730 the read request is sent to the flash. The procedure 700 may then end in step 735, until another read request is received.

It should be noted that while certain steps within procedures 600-700 may be optional as described above, the steps shown in FIGS. 6-7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 600-700 are described separately, certain steps from each procedure may be incorporated into each other procedure, and the procedures are not meant to be mutually exclusive. Further still, the procedures 600-700 can be performed by any of the associated components or component connectivity from the different memory and controller configurations in FIGS. 1A, 1B, and 2, or any other system architecture that may be implemented in view of the teachings herein.

The techniques described herein, therefore, provide for flashware usage mitigation. In particular, the techniques herein mitigate the problem associated with the limited used of P/E cycles in flashware, particularly extending the useful lifetime of the flash in the devices hosting third party applications, while making flash lifetime and platform lifetime more predictable, despite providing the ability to have an unlimited number and frequency of posted write cycles by hosted applications into the system flash. Generally, the techniques herein are applicable to any third party application, enabling non-volatile storage for the guest applications by sharing the device's (e.g., router's) system flashware, such that no separate storage is required, and there is no need to modify a device's hardware to add additional storage, significantly lowering the cost of hosting third party applications (flash-based storage is currently one of the most expensive components in a system). However, the techniques herein are not so limited, and may equally be applicable to mitigating P/E cycles for core functionalities of the device. Lastly, the techniques herein may also lower power consumption by the device, as aggregating P/E requests, and thus reducing the number of actual P/E cycles to the flashware, reduces power consumption of the entire system.

In addition, it is again important to note that the techniques herein protect the core (e.g., router) OS from the applications. That is, third party applications running in a VM can only write in certain memory in the flash, which is controlled by the memory control process (e.g., a trusted core process). Notably, VMs run by a hypervisor have their own RAM, which is separate from the core OS, and applications cannot write into the core OS RAM (according to VM definition). The techniques herein, additionally therefore, also thus protect the flash owned by the core OS.

While there have been shown and described illustrative embodiments that provide for flashware usage mitigation, it is to be understood that various other adaptations and modifications may be made within the spirit and scope of the embodiments herein. For example, the embodiments have been shown and described herein with relation to routers and computer networks. However, the embodiments in their broader sense are not as limited, and may, in fact, be used with other types of devices. In addition, while certain types of memory (e.g., RAM), flashware (e.g., CF), and memory synchronization protocols/utilities (e.g., RSync) are mentioned, other suitable memories, flash devices, and protocols/utilities may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   receiving, at a memory control process of a device, a request for a flash memory of the device;
   determining, by the memory control process of the device, whether the request is a program/erase (P/E) request or a read request;
   in response to determining that the request is a read request, determining, by the memory control process, whether data associated with the read request is more recent on a random access memory (RAM) of the device or the flash memory of the device, wherein the data associated with the read request is read from the RAM when data associated with the read request is most recent on the RAM;
   in response to determining that the request is a P/E request, storing, by the memory control process, the data associated with the P/E request in the RAM;
   determining, by the memory control process, a given time interval to aggregate each of a plurality of P/E requests based on one or more of a total size of the flash memory, an amount of the flash memory allocated to one or more applications generating the plurality of P/E requests, a type of the flash memory, and a projected lifetime of the flash memory;
   aggregating, by the memory control process, each of the plurality of P/E requests received over the given time interval into a single P/E operation; and
   sending, from the memory control process, the single P/E operation to the flash memory at the given time interval to update the flash memory with the data stored in the RAM.

2. The method as in claim 1, wherein the given time interval is based on a number of the aggregated plurality of P/E requests.

3. The method as in claim 1, wherein the given time interval is based on a size of the single P/E operation from the aggregated plurality of P/E requests.

4. The method as in claim 1, wherein the given time interval is based on a particular application forcing a P/E operation to the flash memory.

5. The method as in claim 1, further comprising:
   receiving, at the memory control process, a read request for the flash memory of the device; and
   sending, from the memory control process, the read request to the flash memory.

6. The method as in claim 5, further comprising:
   determining, in response to receiving the read request, if requested data of the read request corresponds to a more recent copy of the requested data stored in the RAM; and
   if so, sending, from the memory control process, the read request to the RAM.

7. The method as in claim 1, wherein the device is a router.

8. The method as in claim 1, wherein a core operating system owns the flash memory, and wherein the memory control process is located within a hypervisor operating system that hosts applications in a virtual environment, the RAM being accessible directly to the hypervisor operating system, the memory control process configured to send the single P/E operation to the flash memory via an interface to the core operating system.

9. The method as in claim 1, further comprising:
   dedicating a first portion of the flash memory to a core operating system; and
   dedicating a second portion of the flash memory to applications executed by an operating system other than the core operating system, the second portion distinct from the first portion;
   wherein aggregating the plurality of P/E requests and sending the single P/E operation is based on the dedicated first and second portions.

10. An apparatus, comprising:
    a processor configured to execute one or more processes;
    a flash memory;
    a random-access memory (RAM); and
    an operating system configured to store a memory control process executable by the processor, the memory control process when executed operable to:
    receive a request for the flash memory;
    determine whether the request is a program/erase (P/E) request or a read request;
    in response to determining that the request is a read request, determine whether data associated with the read request is more recent on the RAM or the flash memory, wherein the data associated with the read request is read from the RAM when data associated with the read request is most recent on the RAM;
    in response to determining that the request is a PE request, store the data associated with each of the plurality of the P/E request in the RAM;
    determine a given time interval to aggregate each of a plurality of P/E requests based on one or more of a total size of the flash memory, an amount of the flash memory allocated to one or more applications generating the plurality of P/E requests, a type of the flash memory, and a projected lifetime of the flash memory;
    aggregate each of the plurality of P/E requests received over the given time interval into a single P/E operation; and
    send the single P/E operation to the flash memory at the given time interval to update the flash memory with the data stored in the RAM.

11. The apparatus as in claim 10, wherein the given time interval is based on at least one of: a number of the aggregated plurality of P/E requests, a size of the single P/E operation from the aggregated plurality of P/E requests, and a particular application forcing a P/E operation to the flash memory.

12. The apparatus as in claim 10, wherein the process when executed is further operable to:
   receive a read request for the flash memory of the device; and
   determine, in response to receiving the read request, if requested data of the read request corresponds to a more recent copy of the requested data stored in the RAM;
   if so, send the read request to the RAM; and
   if not, send the read request to the flash memory.

13. The apparatus as in claim 10, wherein the apparatus is a router.

14. The apparatus as in claim 10, wherein a core operating system of the apparatus owns the flash memory, and wherein the memory control process is located within a hypervisor operating system of the apparatus that hosts applications in a virtual environment, the RAM being accessible directly to the hypervisor operating system, the memory control process configured to send the single P/E operation to the flash memory via an interface to the core operating system.

15. The apparatus as in claim 10, wherein the process when executed is further operable to:
   dedicate a first portion of the flash memory to a core operating system; and
   dedicate a second portion of the flash memory to applications executed by an operating system other than the core operating system, the second portion distinct from the first portion;
   wherein aggregating the plurality of P/E requests and sending the single P/E operation is based on the dedicated first and second portions.

16. A tangible, non-transitory, computer-readable media having software encoded thereon, the software when executed by a processor operable to:
   receive a request for a flash memory of a device;
   determine whether the request is program/erase (P/E) request or a read request;
   in response to determining that the request is a read request, determine whether data associated with the read request is more recent on a random access memory (RAM) of the device or the flash memory of the device, wherein the data associated with the read request is read from the RAM when data associated with the read request is most recent on the RAM;
   in response to determining that the request is a PE request, store the data associated with the P/E request in the RAM;
   determine a given time interval to aggregate each of a plurality of P/E requests based on one or more of a total size of the flash memory, an amount of the flash memory allocated to one or more applications generating the plurality of P/E requests, a type of the flash memory, and a projected lifetime of the flash memory;
   aggregate each of the plurality of P/E requests received over the given time interval into a single P/E operation; and
   send the single P/E operation to the flash memory at the given time interval to update the flash memory with the data stored in the RAM.

* * * * *

UNITED STATES PATENT AND TRADEMARK OFFICE
CERTIFICATE OF CORRECTION

| | |
|---|---|
| PATENT NO. | : 10,474,570 B2 |
| APPLICATION NO. | : 14/951357 |
| DATED | : November 12, 2019 |
| INVENTOR(S) | : Leo Dumov et al. |

It is certified that error appears in the above-identified patent and that said Letters Patent is hereby corrected as shown below:

In the Specification

In Column 6, Line 16, please amend as shown:
cations storage. In addition, by also isolating the mirroring In Column 6, Line 21, please amend as shown:
the RAM 130 to mirror the targeted flash capacity 420 is 1:1.

In Column 6, Line 24, please amend as shown:
be used to mirror the flash.

In Column 7, Line 66, please amend as shown:
230 due to synchronizing the mirror RAM 230 by reading Signed and Sealed this
Thirtieth Day of June, 2020

Andrei Iancu
*Director of the United States Patent and Trademark Office*